United States Patent [19]

Downing

[11] 3,781,810

[45] Dec. 25, 1973

[54] SCHEME FOR SAVING AND RESTORING REGISTER CONTENTS IN A DATA PROCESSOR

[75] Inventor: Randall William Downing, Fair Haven, N.J.

[73] Assignee: Bell Telephone Laboratories, Incorporated, Murray Hill, Berkeley Heights, N.J.

[22] Filed: Apr. 26, 1972

[21] Appl. No.: 247,727

[52] U.S. Cl. .............................................. 340/172.5
[51] Int. Cl. ............................................... G06f 9/12
[58] Field of Search .................................. 340/172.5

[56] References Cited

UNITED STATES PATENTS

| | | | |
|---|---|---|---|
| 3,323,110 | 5/1967 | Oliari et al. | 340/172.5 |
| 3,061,192 | 10/1962 | Terzian | 340/172.5 |
| 3,541,528 | 11/1970 | Randell | 340/172.5 |
| 3,629,848 | 12/1971 | Gibson et al. | 340/172.5 |

*Primary Examiner*—Harvey E. Springborn
*Attorney*—W. L. Keefauver et al.

[57] ABSTRACT

A program controlled computer which comprises independent control circuitry for exchanging data between registers of the computer and the computer memory independently of the execution of program. This arrangement saves computer time as it facilitates the storing and retrieving of data which must be saved during nesting and unnesting of program transfers. For each register that contains data which is to be saved upon the occurrence of a program interrupt, there is provided an auxiliary register and program controlled gates for exchanging data between the computer register and its corresponding auxiliary register. In the illustrative embodiment the computer is arranged to execute "save" and "restore" instructions which serve respectively to transfer the contents of a computer register to its auxiliary register and to transfer the contents of an auxiliary register to its associated computer register. The independent control circuitry monitors the busy and idle states of the computer memory and upon occurrence of periods of time in which the computer is not utilizing the computer memory, the independent control circuitry exchanges data between the auxiliary registers and the computer memory. Data is exchanged between the computer registers and their associated auxiliary registers simultaneously. However, data is exchanged between the auxiliary registers and the computer memory on a word-by-word serial basis.

4 Claims, 10 Drawing Figures

FIG. 3

| INSTR. ADDR. | INSTRUCTION CODE |
|---|---|
| 1A | EXECUTE |
| ---- | |
| 2A | SAVR 1, n |
| 2B | CALL SUBA (D, P, R) |
| ---- | |
| 3A | END |
| 3B | SUBROUTINE SUBA (X, Y, Z) |
| ---- | |
| 4A | SAVR 1, n |
| 4B | CALL SUBB (G, F) |
| ---- | |
| 5A | RESR 1, n |
| 5B | END |
| ---- | |
| 5C | SUBROUTINE SUBB (S, T) |
| ---- | |
| 6A | RESR 1, n |
| 6B | END |

FIG. 4

| DATA ADDR. | MEMORY LOCATION |
|---|---|
| $AREG_{nm}$ | |
| ---- | ---- |
| $AREG_{n2}$ | $Y_n$ |
| $AREG_{n1}$ | $X_n$ |
| ---- | ---- |
| $AREG_{1m}$ | |
| ---- | ---- |
| $AREG_{12}$ | $Y_1$ |
| $AREG_{11}$ | $X_1$ |

FIG. 5

| BASE ADDRESS | REGISTER ADDRESS | POINTER |
|---|---|---|

SCHEME FOR SAVING AND RESTORING REGISTER CONTENTS IN A DATA PROCESSOR

BACKGROUND OF THE INVENTION

1. Field of the Invention

This invention relates to a program controlled data processor which has provision for the nesting of program transfers.

2. Prior Art

In many uses of a program controlled data processor it is desirable to be able to save the contents of certain machine registers when control of the data processor is transferred from one point to another in a program.

In prior program controlled data processors the contents of the said certain machine registers are transferred to memory under the control of a subroutine which is designed for that purpose. After execution of this subroutine, the program sequence to which transfer is to be made is executed. Upon completion of the transferred to program sequence the data which has been stored in memory is returned to the said certain registers under the control of another subroutine and the program which was interrupted is executed from the point at which it was interrupted. This same procedure is followed when a transferred to program is interrupted to permit execution of a further subroutine. The occurrence of successive transfers from a main program to a subroutine and then to a further subroutine is termed "nesting of transfers" and the orderly return to the interrupted subroutine or subroutines and to the main program is termed "unnesting." These prior art arrangements for saving data for subsequent use in the execution of interrupted programs utilize a substantial period of time for storing the data to be saved in memory and for retrieving that data for subsequent use.

SUMMARY OF THE INVENTION

In accordance with applicant's invention, for each machine register that contains data which is to be saved upon the occurrence of a program interrupt, there is provided an auxiliary register and program controlled gates for exchanging data between each such computer register and its corresponding auxiliary register, and independent control circuitry for exchanging data between the auxiliary registers and memory during periods of time that execution of the program does not require the computer to have access to the memory. The program controlled gate circuits which serve to exchange data between the machine registers and their corresponding auxiliary registers are activated under the control of program instructions termed "save" and "restore" to effect transfer of data from a machine register to an auxiliary register and from an auxiliary register to a machine register, respectively. A "save" instruction provides for the simultaneous transfer of data from all machine registers specified by that instruction to their corresponding auxiliary registers. Similarly, the "restore" instruction is utilized to simultaneously transfer data to all machine registers specified by that instruction from their corresponding auxiliary registers. The independent control circuitry is activated each time a "save" or a "restore" instruction is executed by the computer and that independent control circuitry monitors the busy and idle states of the computer memory to detect periods of time in which the control circuitry can exchange data between the auxiliary registers and the computer memory without interruption of program. The independent control circuitry serves to store in memory the information contents of the auxiliary registers without destruction of the data in the auxiliary registers. Accordingly, there is redundant data stored in the auxiliary registers and in the memory for the last executed "save" instruction. In the event that there are a sufficient number of unused memory cycles between the occurrence of successive "save" instructions or successive "restore" instructions, the computer program can be executed without interruption to provide for the exchange of data between the auxiliary registers of the memory. However, in the event that there are insufficient idle memory cycles between, for example, "save" instructions, then the program being executed must be interrupted to permit the independent control circuit to complete the word-by-word transfer of data.

DESCRIPTION OF THE FIGURES

FIG. 3 shows symbolic coding of a program that is useful in describing the invention;

FIG. 4 shows a memory map of the portion of the data processor memory used to store the contents of registers;

FIG. 5 shows the format of the address used to store and restore register contents;

GENERAL DESCRIPTION OF THE ILLUSTRATIVE EMBODIMENT

Figure 1:
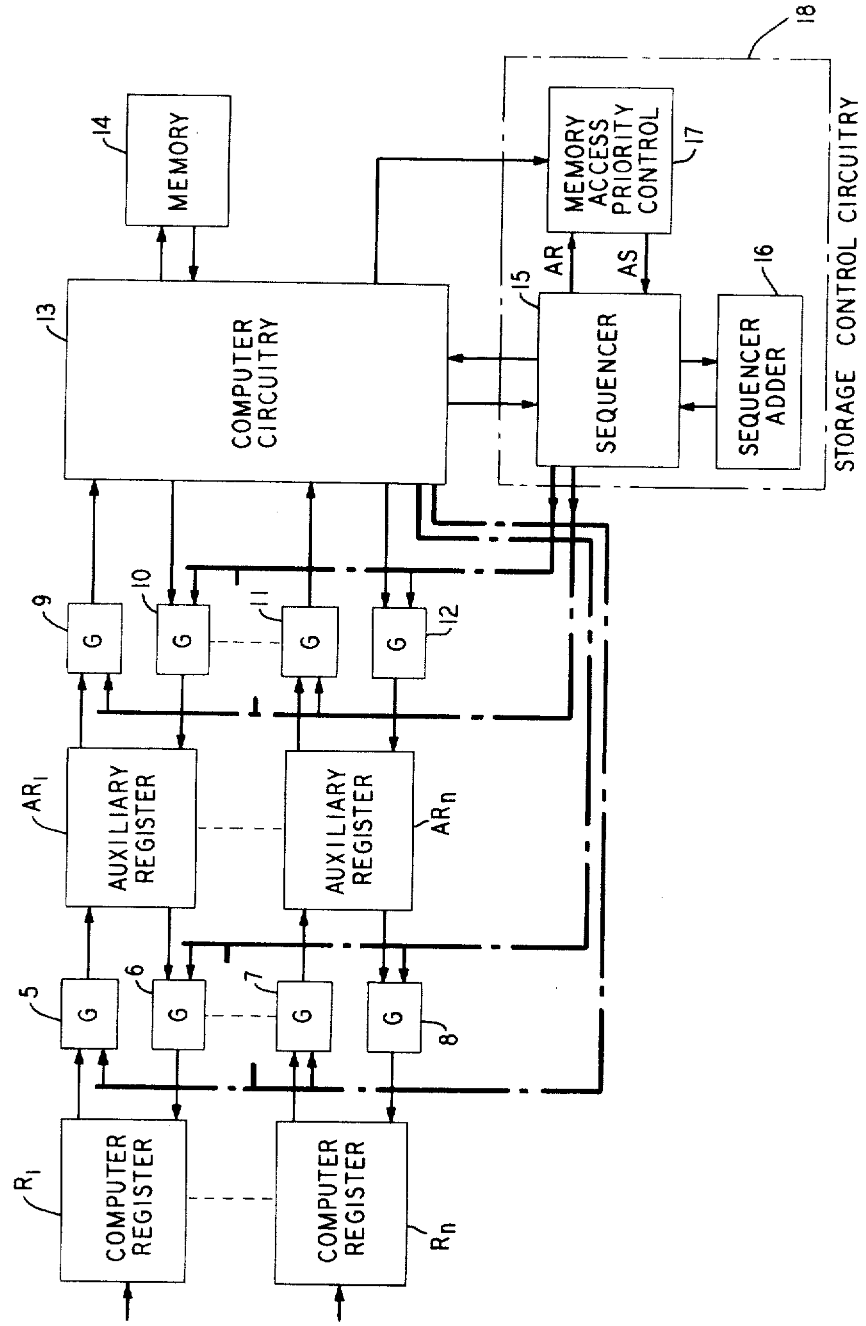
FIG. 1 shows a general block diagram of the illustrative embodiment of the invention.
Figure 9:
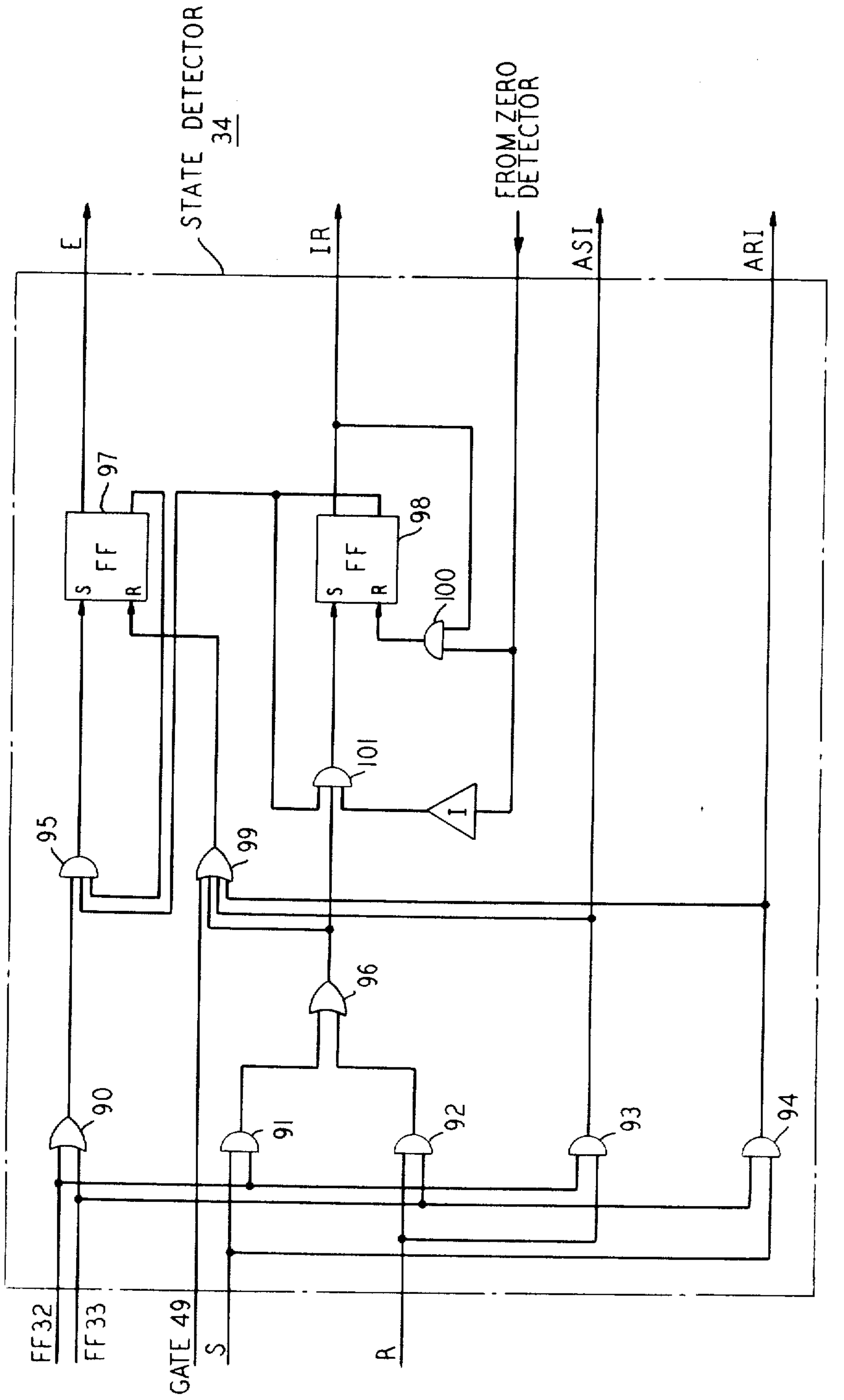
FIG. 9 shows the circuitry of the state detector in the sequencer shown in FIG. 2B.

A general block diagram of an illustrative embodiment of applicant's invention is shown in FIG. 1. The computer 13 may be any one of numerous well known computers that operate under the control of a stored program. An example of a computer 13 is found in U.S. Pat. No. 3,570,008. In the illustrative embodiment of this invention such a computer is modified to provide the auxiliary registers $AR_1$ through $AR_n$ and provisions are made for generating control signals in response to the appearance of "save" and "restore" instructions in the instruction register 23. The processor of this prior art patent is arranged to operate in a three-cycle overlap mode and signals defining the busy-idle states of the call store 103 are available at the output of the decoder circuits BOWD, OWD, and MXD shown in FIG. 9 of the patent and at the output of the order combining gate circuit (OCG) also shown in FIG. 9 of the patent. The addition of the instructions "save" and "restore" to the instruction set of the reference patent requires modification of the decoder circuits to provide the necessary internal control signals in response to these new instructions and the addition of an independent sequencing circuit which is enabled by the execution of these two instructions and proceeds independently, as explained later herein, whenever the call store 103 is indicated to be idle. When either of these two types of instructions is executed by the computer 13, selected ones of the gates 5 through 8 are enabled and the storage control circuitry 18 is activated. These conditions result in data being either transferred from selected ones of the registers R1 through R$n$ into selected auxiliary registers AR1 through AR$n$ or data being transferred into selected registers R1 through R$n$ from selected auxiliary registers AR1 through AR$n$ and from selected memory locations into the selected auxiliary registers. Each of the auxiliary registers AR1 through AR$n$ is utilized as temporary storage for data that has either been transferred from a register $R_i$ or data transferred from memory that is ultimately to be stored in a register $R_i$. For purposes of explanation it will be assumed that the program controlling the computer 13 contains two save register contents instructions and two restore register contents instructions (FIG. 3). It will further be assumed that each of these instructions indicates that the contents of the register R1 and Rn are to be either saved or restored.

When the first save register contents instruction 2A (FIG. 3) is decoded, the gates 5 and 7 (FIG. 1) will be enabled by signals generated by the computer 13, resulting in the contents of the registers R1 and R$n$ being stored in the auxiliary registers AR1 and AR$n$, respectively. Simultaneously, the decoding of this instruction will result in computer 13 generating signals that enable the storage control circuitry 18. Enabling this circuitry results in the sequencer 15 generating a signal AR that is applied to the memory access priority control 17. If the program being executed requires access to the memory 14 at the time the signal AR is applied to the memory access priority control 17, there will be no return signal to the sequencer 15 and no processing of the data contained in the auxiliary registers AR1 and AR$n$ will occur. If, on the other hand, the program being executed does not require memory access at the time the sequencer 15 applies the signal AR to the memory access priority control 17, the memory access priority control will generate a return signal AS that is applied to the sequencer 15, indicating that the sequencer can have access to memory 14 during this machine cycle without interrupting the execution of the program. When this occurs, the sequencer generates a signal that is applied to the gate 9 and simultaneously supplies a memory address to the computer 13. At this time, the gate 9 is enabled and the data in the auxiliary register AR1 is transferred to the memory location identified by the address data supplied to the computer 13 by the sequencer 15.

Following this operation, the sequencer, through the continued generation of the signal AR, again attempts to gain access to the memory 14 so that the contents of the auxiliary register AR$n$ may be stored in memory. If, as previously mentioned, the program being executed requires access to memory at this time, the priority control 17 will not return the signal AS to the sequencer and the contents of the auxiliary register AR$n$ will not be processed during this cycle of operation. On the other hand, if the program being executed does not require access to the memory at this time, the priority control 17 will again return the signal AS to the sequencer 15. Upon receiving the signal AS, the sequencer 15 will generate a signal that enables the gate 11 and also supply a memory address to the computer 13. When the gate 11 is enabled, the computer 13 will store the contents of the auxiliary register AR$n$ in the memory location identified by the address supplied to the computer by the sequencer 15.

When the second save instruction 4A (FIG. 3) is encountered in the program being executed, the foregoing operations will be repeated. The contents of the registers R1 and R$n$ (FIG. 1) at the time this instruction is decoded by the computer will be transferred to the auxiliary registers AR1 and AR$n$, respectively. The sequencer 15 will again be enabled and the contents of the auxiliary register AR1 and AR$n$ will be stored in selected memory locations during memory access cycles that are not used during program execution.

At this point, two save instructions in the program being executed have been encountered and the contents of the two registers R1 (FIG. 1) and R$n$, at two different points in time, have been stored in selected memory locations of the memory 14. It will now be assumed that two restore register contents instructions 5A and 6A (FIG. 3) are encountered at selected points in the program being executed which indicate that the contents of the registers R1 and Rn previously stored in the memory 13 are to be transferred back to the appropriate registers.

When the first restore instruction 5A (FIG. 3) is encountered, the computer 13 (FIG. 1) will generate a signal that enables the gates 6 and 8. Enabling these gates results in the contents of the auxiliary registers AR1 and ARn being transferred into the registers R1 and Rn, respectively. It will be recalled that the auxiliary registers AR1 and AR$n$ contain the last stored contents of the registers R1 and R$n$ as a result of the execution of the save instruction 4A (FIG. 3). Consequently, transferring the contents of these two auxiliary registers back into the registers R1 and R$n$ restores the contents of the registers to what they were at the time the last save instruction 4A was executed.

At the same time the restore instruction is decoded and the auxiliary register contents are transferred to the registers R1 and R$n$(FIG. 1), the sequencer 15 is also enabled and again applies a signal AR to the priority control 17 as a request for access to the memory 14. As previously mentioned, if the program being executed does not require access to memory at this time the priority control will return a signal AS to the sequencer 15 indicating that memory may be accessed without interrupting program execution. When the signal AS is returned to the sequencer 15, the sequencer generates signals enabling the gate 10 and supplies address information to the computer 13 that identifies the location in the memory 14 occupied by the data contained in the register R1 at the time the first save instruction 2A (FIG. 3) was executed. This results in the original contents of the register R1 (FIG. 1) being transferred from memory into the auxiliary register AR.

At this point, since the contents of another register Rn remains to be processed, the signal AR is still being applied to the priority control 17 to determine if the sequencer 15 can have access to the memory 14 without interrupting the execution of the program. Assuming that the sequencer 15 can gain access to the memory 14 without interrupting program execution, the signal AS will again be returned to it by the memory access priority control 17. At this time the sequencer generates a signal that enables the gate 12 and supplies the address of the location in memory containing the data originally present in the register Rn when the first save instruction 2A (FIG. 3) was executed. This results in the original contents of the register R*n* (FIG. 1) being transferred to the auxiliary register AR1. At this point, the execution of the first restore instruction 5A (FIG. 3) has resulted in the contents of the auxiliary registers AR1 and AR*n*, which consist of the data in the registers R1 and R*n* when the second save instruction 4A (FIG. 3) was executed, being transferred back into the registers R1 and R*n*, respectively, and the data in the registers R1 and R*n* that was stored when the first save instruction 2A was executed being transferred from memory into the auxiliary registers AR1 and AR*n*, respectively.

When the second restore instruction 6A (FIG. 3) is encountered and decoded, the computer 13 (FIG. 1) generates a signal that enables the gates 6 and 8 again, resulting in the contents of the auxiliary registers AR1 and ARn being transferred into the registers R1 and R*n*, respectively. At this point, the data originally contained in the registers R1 and R*n* and stored in memory when the first save instruction 2A (FIG. 3) was decoded are again present in those registers. The storage control circuitry will not be enabled at this time since no data remains to be accessed from the memory 14.

The foregoing has generally illustrated the operation of applicant's invention. It was assumed that there were sufficient unused memory access cycles available between executions of save and restore instructions to allow the storage control circuitry 18 to complete the required processing of the register R1 and Rn data. As previously mentioned, for the situation where this assumption is not true, the execution of the program is either interrupted to allow the storage control circuitry 18 (FIG. 1) time to complete the processing of data or the storage control circuitry ceases its current operation and begins performing the operations specified in the newly decoded instruction.

DETAILED DESCRIPTION OF THE ILLUSTRATIVE EMBODIMENT

Figure 2A:
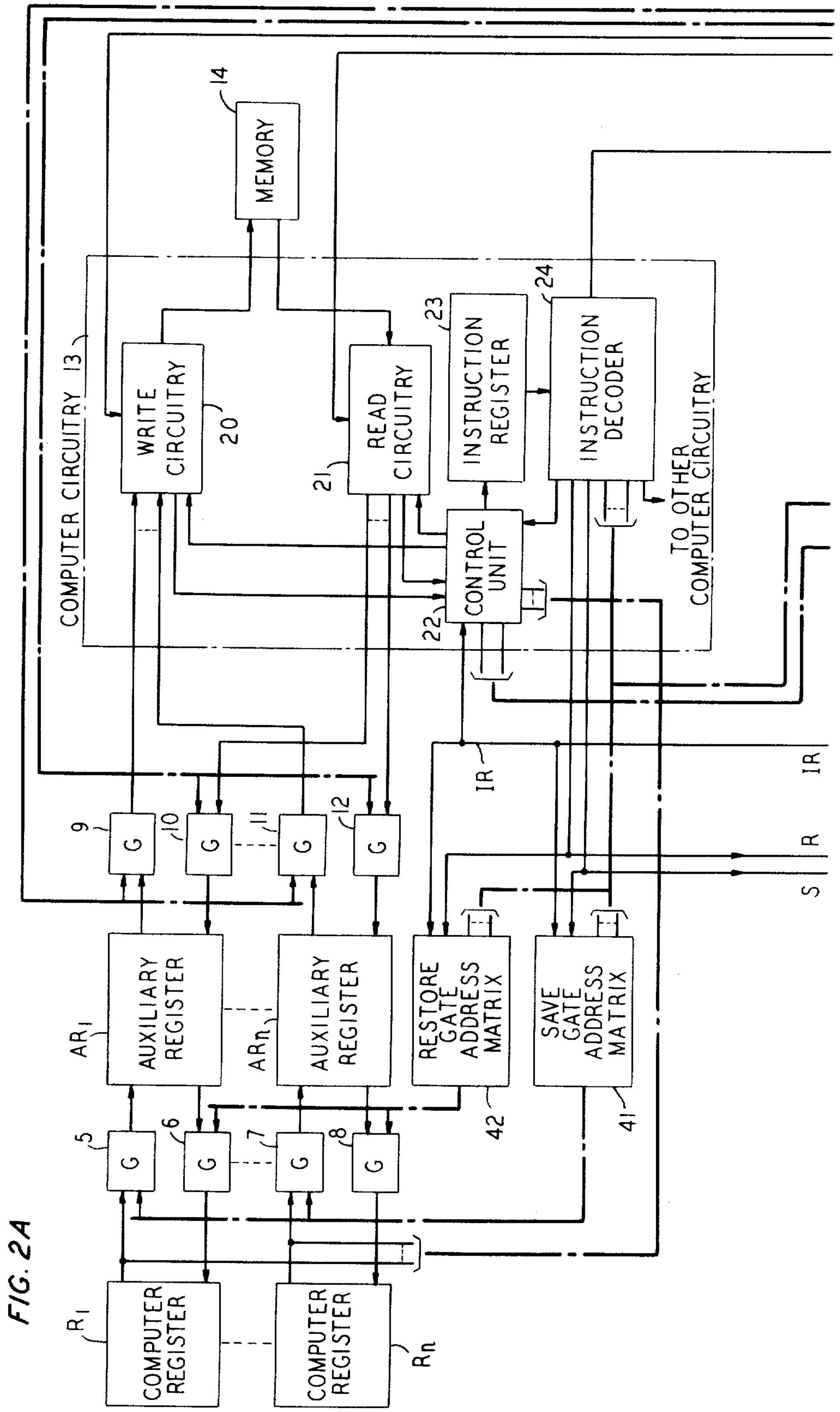
FIG. 2A and 2B show a more detailed block diagram of the system shown in FIG. 1.
Figure 2B:
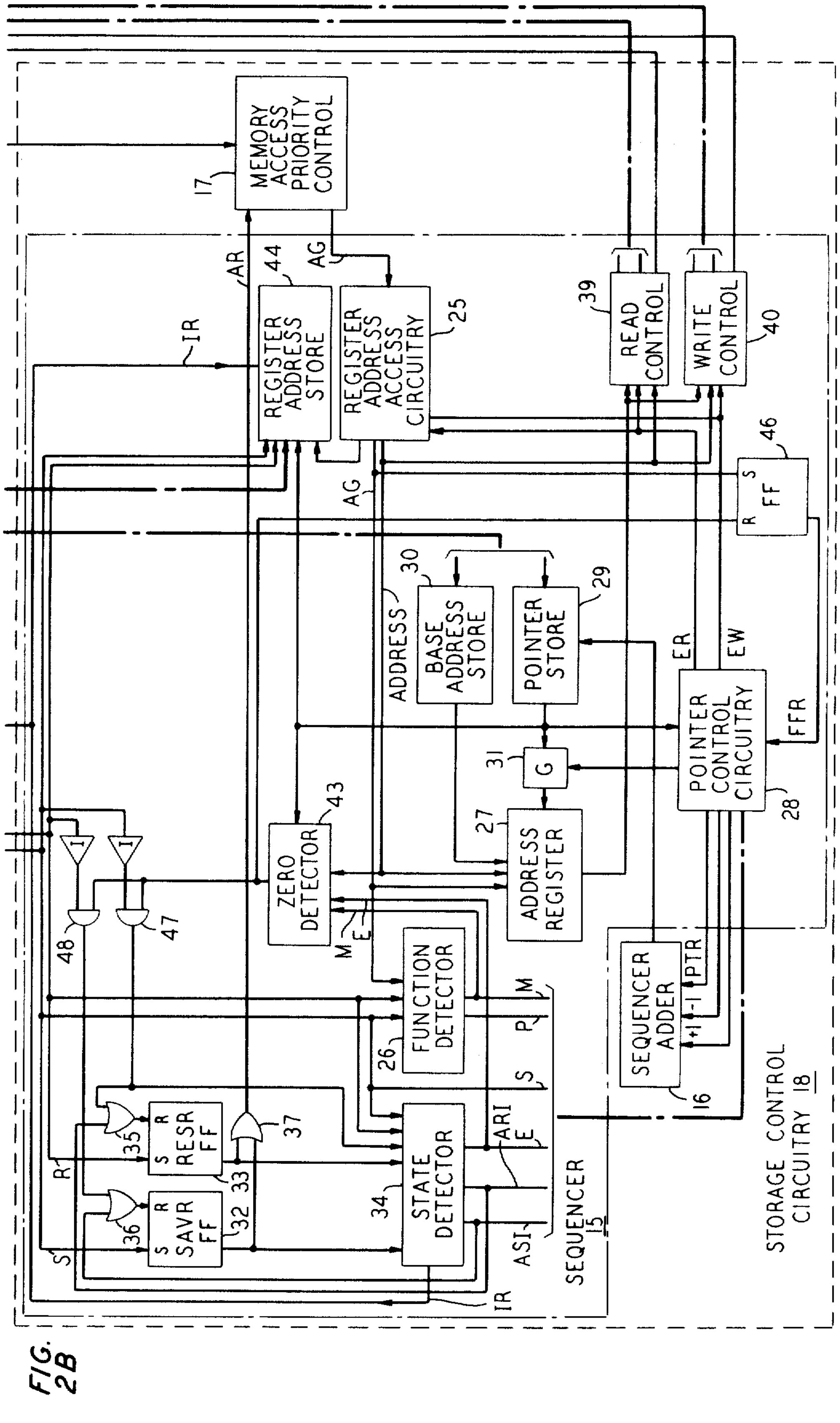

A detailed block diagram of the illustrative embodiment applicant's invention is shown in FIG. 2A and 2B. It will be assumed, as previously indicated, that the symbolic program coding shown in FIG. 3 has been assembled and is stored in a portion of the memory 14 (FIG. 2A) and that the assembly program is in control of the computer circuitry 13. Referring to FIG. 3 it will be seen that the program shown there includes nested calls to subroutines. More specifically, the main portion of the program 1A–3A includes a call to the subroutine SUB A and the subroutine SUB A includes a call to the subroutine SUB B. In essence, the call to the subroutine SUB B is nested in the subroutine SUB A.

It will also be recalled that there are save instructions in the locations 2A (FIG. 3) and 4A which immediately precede the calls to the subroutine SUB A and SUB B, respectively. Similarly there are restore instructions in the locations 5A and 6A which immediately precede the final END instruction in the subroutines SUB A and SUB B. As previously indicated, the coding in FIG. 3 represents a program which instructs the computer to save the contents of the machine registers R1 (FIG. 2A) and R*n* when the instruction in location 2A is performed immediately prior to transferring control to the subroutine SUB A and the contents of these registers are again saved when the instruction in location 4A (FIG. 3) is performed prior to calling the subroutine SUB B. Furthermore, when the execution of the subroutine SUB B is completed, execution of the restore instruction in location 6A results in the computer restoring the contents of the registers R1 (FIG. 2A) and R*n* that were present in the registers when the subroutine SUB B was called. More specifically, the register contents that were saved when the save instruction 4A was executed will be restored to the registers when the restore instruction 6A is executed. Similarly, upon completing the execution of the subroutine SUB A the restore instruction in location 5A is executed resulting in the computer restoring the data contained in the registers R1 and R*n* when the save instruction 2A was executed.

It will be assumed, for purposes of discussion, that the registers R1 (FIG. 2A) and R*n* initially contain the data X1 and X*n*. Returning to FIG. 3, when the save instruction in location 2A is read into the instruction register 23 (FIG. 2A) during the execution of the program, the instruction decoder 24 (FIG. 2A) generates a save signal S and applies the address portion 1 and *n* of the instruction to the save gate address matrix 41. Application of the signal S and the address data 1 and *n* to the save gate address matrix 41 results in signals being applied to the gates 5 and 7 which connect the registers R1 and R*n* to their respective auxiliary storage registers AR1 and AR*n*. Enabling these gates transfers the contents X1 and Xn of the registers R1 and R*n* into the auxiliary registers AR1 and ARn where they are temporarily stored.

Simultaneously, the signal S is also applied to the set input of the SAVR flip-flop 32 (FIG. 2B) resulting in a 1 being applied to the state detector 34 and the OR gate 37. The application of the 1 to an input of the OR gate 37 enables the gate resulting in the signal AR being generated. It will be recalled that this signal AR is a memory access request signal utilized by the sequencer 15, along with signals from the control unit 22 (FIG. 2A), to determine if it may gain access to the memory 14 without interrupting the execution of the program (FIG. 3) in control of the computer 13.

The foregoing has described how the save instruction SAVR 1,*n* in location 2A (FIG. 3) is decoded and results in the contents of the registers R1 (FIG. 2A) and R*n* being gated into the auxiliary registers AR1 and AR*n*, respectively, leaving the registers R1 and R*n* free for use by the program while the contents of these registers are temporarily stored for further processing. In addition, it has been shown how the execution of this instruction results in the storage control circuitry 18 (FIG. 2B) generating a memory access request signal AR that is utilized, in conjunction with signals generated by the control unit 22 (FIG. 2A), to determine if access may be gained to the memory 14 without interrupting the execution of the program.

The memory access request signal AR (FIG. 2B) is applied to the memory access priority control 17. The memory access priority control 17 might be any one of numerous different types of well known priority control circuitry. Basically, input signals are applied to this circuitry and it is determined if the program in control of the computer requires access to the memory during a given cycle of computer operation time. If the program does not require access to the memory 14 (FIG. 2A ) at the time the memory access request signal AR is applied to the memory access priority control 17 (FIG. 2B), the memory access priority control responds by generating a memory access granted signal AG that is applied to the register address access circuitry 25. The register address access circuitry 25 serves two functions. The first is to access a register address from the register address store 44 each time the memory access signal AG is applied until all of the register addresses in the store have been accessed. The second function of the access circuitry 25 is to detect when all of the register addresses stored in the address store 44 have been accessed and generated a signal indicating that the contents of all the registers identified by the addresses have been processed.

The register addresses required by the sequencer 15 (FIG. 2B) are obtained in the following manner. At the time the save instruction in location 2A (FIG. 3) is decoded, the signal S generated by this decoding is applied to the register address store 44 along with the register addresses 1,*n* in the operand portion of the save instruction. This combination of inputs results in the addresses 1,*n* being stored in predetermined contiguous locations of the address store 44. In the example being discussed, these two register addresses, identifying the registers R1 (FIG. 2A) and R*n* respectively, will be the register addresses accessed sequentially by the register address access circuitry 25 (FIG. 2B).

Figure 6:
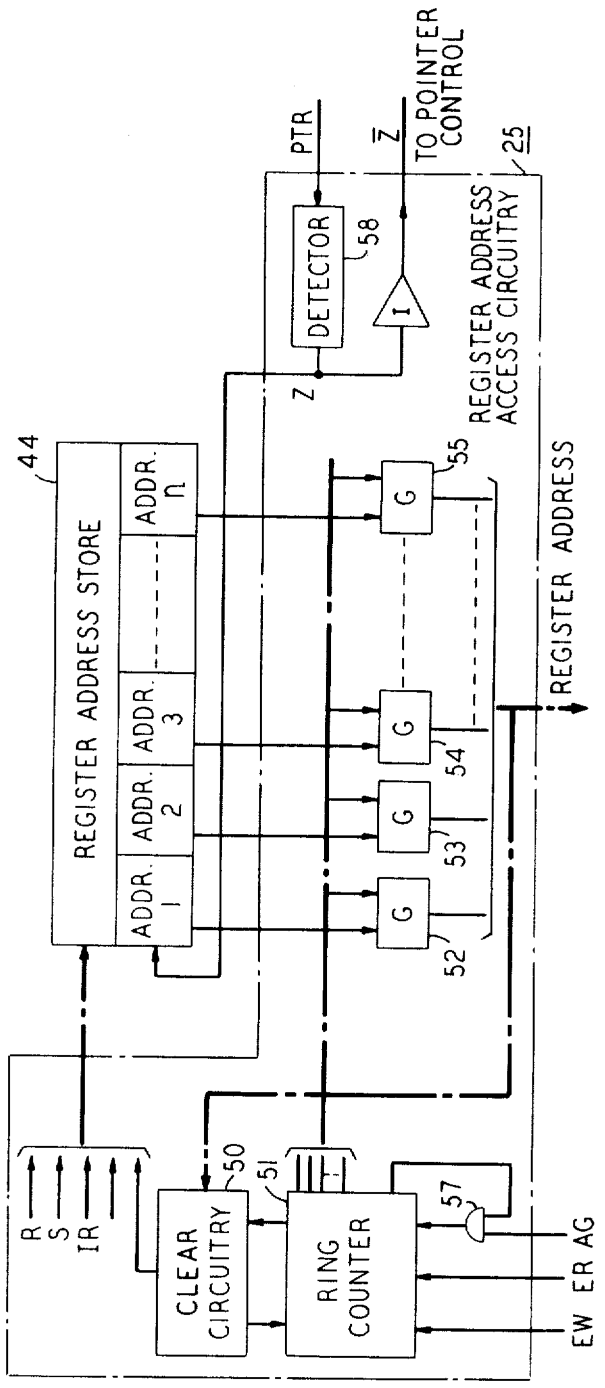
FIG. 6 shows a detailed block diagram of the register address access circuitry in the sequencer shown in FIG. 2B.

When the signal AG is applied to the *n* state ring counter 51 (FIG. 6) in the register address access circuitry 25 this time, the counter state is in its zero state. The AND gate 57 responds to the zero state output of the ring counter 51 and the signal AG by generating a signal that changes the state of the counter to its first state. The output of the counter 51, when it's in its first state, enables the gate 52, resulting in the first address storage location ADDR.1 in the register address store 44 being gated to the output of the register address access circuitry.

Figure 7:
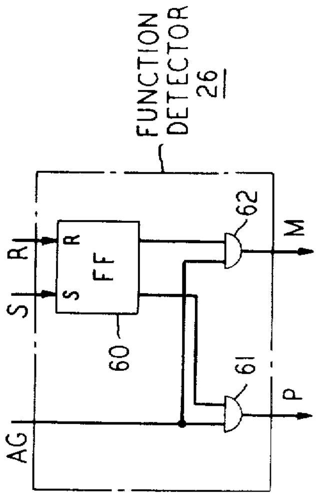
FIG. 7 shows the circuitry of the function detector in the sequencer shown in FIG. 2B.
Figure 8:
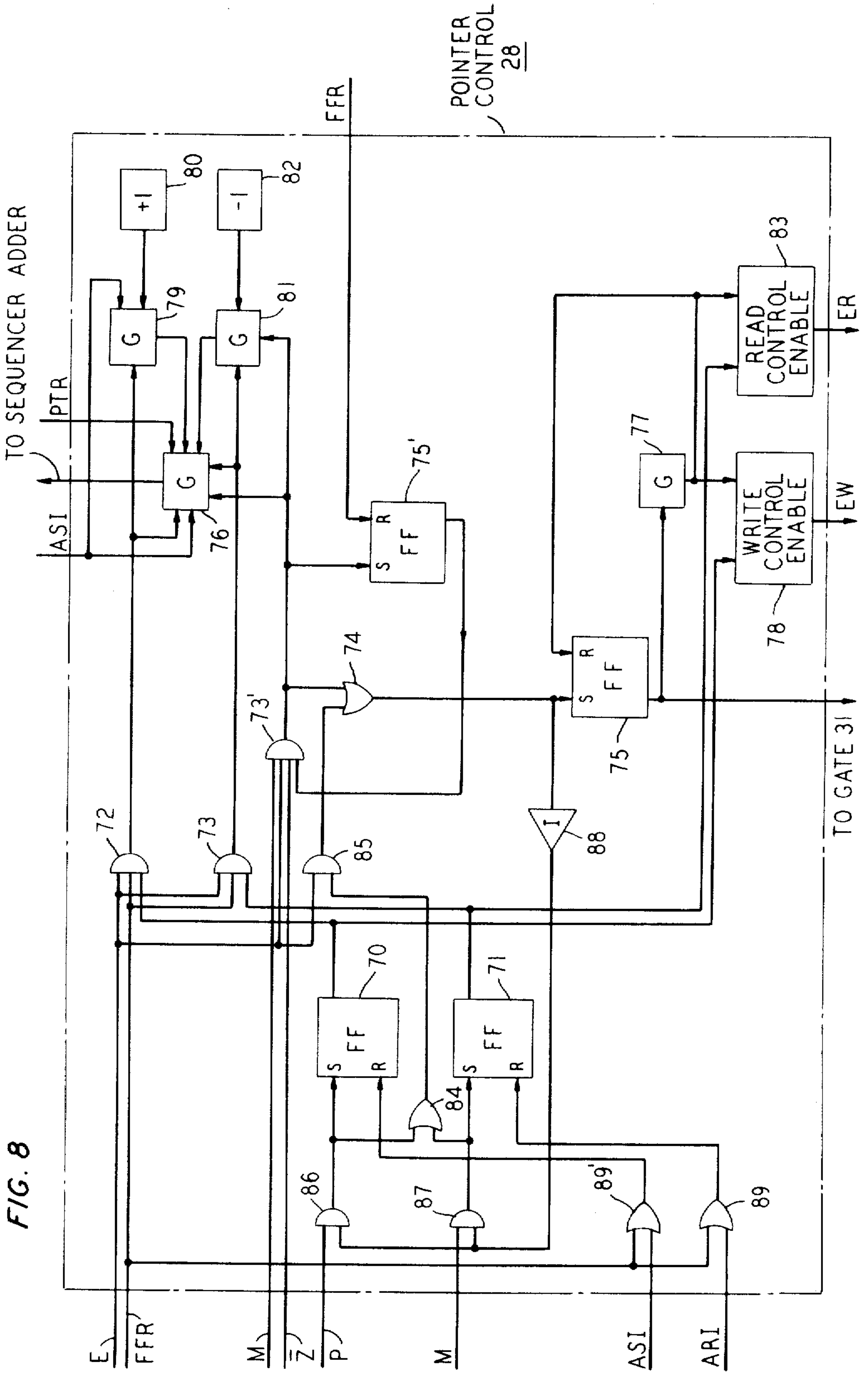
FIG. 8 shows a detailed block diagram of the pointer control circuitry in the sequencer shown in FIG. 2B.

At the same time the memory access granted signal AG (FIG. 2B) is applied to the register address access circuitry 25, it is also applied to the function detector 26. The purpose of the function detector 26 is to generate a signal indicating whether data is to be stored or accessed from memory. In addition to the signal AG, the signal S was also applied to the function detector when the save instruction 2A (FIG. 3) was decoded. The application of the signal S at the time of decoding resulted in the flip-flop 60 (FIG. 7) being set. When the memory access granted signal AG is applied to the function detector 26 (FIG. 2B) and the flip-flop 60 (FIG. 7) in this detector is set, and the AND gate 61 is enabled resulting in the signal P being generated. This signal P, indicating that a save instruction has been encountered and the sequencer 15 has access to the memory, is applied as one input to the pointer control circuitry 28. This signal P sets the flip-flop 70 (FIG. 8) which indicates to the pointer control circuitry 28 that the pointer stored in the pointer store 29 (FIG. 2B) is to be incremented by 1 after its use as part of the memory addresses to be assembled in the address register 27 during the storage of the register contents specified in the save instruction 2A (FIG. 3).

It will be recalled that at the time the save instruction in location 2A (FIG. 3) was decoded, the flip-flop 32 (FIG. 2B) was set, applying a 1 to the state detector 34 as well as the OR gate 37. The application of this 1 to the state detector 34 results in the OR gate 90 (FIG. 9) being enabled. The gate 95 responds to this output of the gate 90, the condition $\bar{E} = 1$, and the reset output of the flip-flop 98 by applying a 1 to the set side of the flip-flop 97. Setting this flip-flop results in the state detector generating a signal E that is applied to the pointer control circuitry 28. The generation of the signal E indicates that data temporarily stored in selected auxiliary registers AR1 through AR*n* (FIG. 2A) must be processed. When the memory access granted signal AG (FIG. 2B) is generated, it also results in the flip-flop 46 being set and this condition, in combination with the existence of the signal E, results in the pointer control being enabled to begin the processing of data in the auxiliary registers. Setting the flip-flop 46 results in a reset output of the flip-flop FFR = 0 which disables the AND gates 72 and 73 (FIG. 8) during the processing of the data in the auxiliary registers. The gates 72 and 73 are disabled to insure that the pointer PTR in the pointer store 29 (FIG. 2B) is not altered during the processing period represented by the duration of the signal E.

As a result of the simultaneous application of the signals E and P to the pointer control 28, the OR gate 84 (FIG. 8) and the AND gate 85 will be enabled. More specifically, the inverted 0 output of the gate 74 and the signal P enable the AND gate 86 which, in turn, enables the OR gate 84 and sets the flip-flop 70. The AND gate 85 is enabled by the simultaneous application of the signal E and the 1 output of the OR gate 84 to its inputs. The state of flip-flop 70 is used later to determine whether a write EW or read ER control enable signal is to be generated by the pointer control circuitry and to indicate that the pointer is to be incremented. Enabling the AND gate 85 results in the OR gate 74 being enabled and this results in the flip-flop 75 being set. Setting the flip-flop 75 generates a signal that enables the gate 31 (FIG. 2B) resulting in the contents of the pointer store 29 being stored in selected locations (FIG. 5) of the address register 27. Additionally, generation of the signal AG results in a base address stored in the base address store 30 and the register address accessed by the register address access circuitry 25 being stored in two sets of locations in the address register 27. It should be noted that the contents of the base address store and the initial contents of the pointer store 29 are set by the user via the computer control circuitry 13 (FIG. 2A). When the foregoing operations are complete, an address in the format shown in FIG. 5 has been assembled in the address register 27 utilizing the contents of the base address store 30, the pointer store 29, and the address of the register R1. In the example being discussed, the address of the first register R1, specified in the save instruction 2A (FIG. 3) is transferred into the register address portion of the address register since the contents of the register R1 are to be stored first.

The address formed in the address register 27 will be such that it identifies the memory location AREG11 shown in the memory map in FIG. 4. This address is applied as an input to the write control 40 in preparation for storing the contents of the auxiliary register AR1 in the memory location AREG11 (FIG. 4). In addition, the register R1 address present at one output of the register address access circuitry 25 is applied to another input of the write control 40. The write control circuitry 40 is enabled by the write control enable signal EW which is generated by the pointer control circuitry 28. More specifically, at the time the flip-flop 75 (FIG. 8) is enabled, resulting in the pointer being transferred from the pointer store into the address register 27 (FIG. 2B), the flip-flop output also enables the gate 77. It will be recalled that the flip-flop 70 was set when the signal P was applied to the pointer control circuitry. The combination of the output of the flip-flop 70 and the gate 77 results in the write control enable generating a signal EW that is applied to the write control circuitry (FIG. 2B). Enabling the write control 40 while it has the register R1 address and the memory address of the register R1 mentioned above applied to it results in the write control generating two types of output signals. The first type is a signal that enables the gate 9 (FIG. 2A) to apply the data X1 in the auxiliary register AR1 to the computer write circuitry. The second output, which consists of the memory address AREG11, simultaneously enables the write circuitry 20, resulting in the contents X1 of the register AR1 being stored in the memory location AREG11 (FIG. 4).

After the original contents X1 of the register R1 FIG. 2A) are transferred from the auxiliary register AR1 to the memory location AREG11 (FIG. 4) the sequencer 15 (FIG. 2B) will store the contents X*n* of the register R*n* in the memory location AREG*n*1 (FIG. 4). It will be recalled that the save instruction originally decoded indicated that the contents of both the register R1 (FIG. 2A) and the register R*n* were to be saved. The storage of the data X*n* is accomplished in essentially the same manner as described in discussing the storage of the data X1. When the pointer control circuitry 28 (FIG. 2B) generates the write enable signal EW resulting in the data X1 being stored, this signal is also applied to the register address access circuitry 25 as well as the write control circuitry 40. Its application to the register address access circuitry 25 indicates that the processing of the contents of one register has been completed and that the processing of the next register may begin if there is another register to be processed. At this time the register address access circuitry 25 will access the register R*n* address *n* from the register address store 44 since this was the second register identified in the save instruction 2A (FIG. 3). More specifically, the signal EW is applied to the ring counter 51 (FIG. 6) in the register address circuitry and this results in the ring counter state being changed to its second state. When the ring counter is in this state, a 1 is applied to the gate 53, enabling it and resulting in the contents of the second storage location ADDR.2 in the register address store 44 being accessed. As mentioned above, this location contains the address *n* of the register R*n*. This accessed register address is applied to the address register 27 (FIG. 2B).

Since nothing has occurred to change the state of the flip-flop 32 (FIG. 2B), which was originally set by the decoding of the save instruction 2A (FIG. 3), the OR gate 37 will still be enabled and the memory access request signal AR will still be applied to the memory access priority control 17. Assuming that the sequencer may gain access to the computer memory 14 (FIG. 2A) at this time without interrupting the execution of the program being executed, a memory access granted signal AG will be present at the output of the memory access priority control 17. As previously mentioned, the presence of this signal AG enables the sequencer for further processing. In this case the sequencer operation will be essentially the same as described in discussing the storage of the contents of the register R1 (FIG. 2A) in the computer memory 14. The register address *n* accessed from the register address store 44 (FIG. 2B) will be applied to the address register 27 by the register address access circuitry 25 at the same time the signal AG is applied to that circuitry. The presence of the signal AG results in the register address *n* and the base address stored in the base address store 30 being gated into the address register in the locations shown in FIG. 5. Simultaneously, the application of the signal E generated by the state detector 34, as a result of the 1 output of the flip-flop 32, and the output of the function detector 26 to the pointer control circuitry 28, results in a signal being applied to the gate 31 which gates the pointer into the address register 27.

More specifically, the application of the signal AG results in the function detector 26 (FIG. 2B) generating the signal P which is applied to the AND gate 86 (FIG. 8) in the pointer control. The other input to this gate is also a 1 since it is the inverted output of the gate 74 which is not enabled at this time. With this combination of inputs, the AND gate 86 is enabled. When, as previously described, the gate 84 (FIG. 8) is enabled and the signal E is present, the gate 85 will be enabled resulting in a signal being generated by the flip-flop 75 that enables the gate 31 (FIG. 2B).

The application of this signal to the gate 31 gates the contents of the pointer store 29 (FIG. 2B) into the pointer portion (FIG. 5) of the address register 27 and, at this point, the address register contains a full memory address identifying the memory location in which the contents X*n* of the auxiliary register AR*n* are to be stored. In this case the address contained in the address register 27 is the address AREG*n*1. At the same time, the gate 31 is enabled to form the address, the output of the flip-flop 75 also enables the gate 77 (FIG. 8) whose output, in combination with the set output of the flip-flop 70, again enables the write control enable circuitry 78 resulting in the signal EW being generated. The assembled memory address and the signal EW are applied to the write control circuitry 40 along with the address of the register R*n* and operations similar to those previously described in discussing the storage of the contents of the auxiliary register AR1 in the memory location AREG11 are repeated. In this case, the write control 40 generates a signal that enables the gate 11 (FIG. 2A) and also applies the address AREGn1 (FIG. 4) to the write circuitry 20. The application of these signals results in the contents X*n* of the auxiliary register AR*n* (FIG. 2A) being stored in the memory location AREG*n*1 (FIG. 4). In essence, the sequencer stores the contents $X_n$ originally contained in the register R*n* in a selected memory location AREG*n*1.

At the time the write control enable signal EW is applied to the write control 40 (FIG. 2B), it is also applied to the register address access circuitry 25. If, as assumed, another unused memory access cycle is available the signal AG will also be applied to the address access circuitry and the circuitry will access the contents of the location ADDR.3 (FIG. 6) in the register address store 44 which would contain the next register address if there was one. As previously mentioned, the application of the signal EW to the ring counter 51 (FIG. 6) in the register address access circuitry 25 results in the state of the ring counter being changed. In this case, the application of the signal EW to the ring counter 51 results in the ring counter's state being changed from its second state to its third state. When the ring counter is in its third state, it generates a signal that enables the gate 54 and results in the contents of the location ADDR.3 being gated to the output of the register address access circuitry.

In this example, this location ADDR.3 (FIG. 6) in the address store 44 contains zero since there are no other registers to be processed. The capacity of the register address store is such that it has one more storage location than there are register addresses to insure that there will be a location containing all zeros when the contents of all the registers R1 through R*n* are to be saved or restored. The application of an all zero address to the zero detector 43 (FIG. 2B) at the same time the signal E is present as an input to the detector results in the detector applying a 1 to the reset side of the flip-flop 46. It will be recalled that this flip-flop was originally set by the first memory access granted signal AG returned by the priority control 17. When the reset output of the flip-flop 46 is FFR = 1, the pointer control circuitry 28 is enabled and performs the operations required to alter the contents of the pointer store in preparation for its use when the next save or restore instruction is decoded.

In essence, resetting the flip-flop 46 (FIG. 2B) indicates to the sequencer 15 that a second phase of sequencer operation has been entered during which the pointer control updates the value of the pointer stored in the pointer store 29. During this phase of operation the pointer is accessed from the pointer store 29 and applied as one input to the sequencer adder 16. Simultaneously, the pointer control 28 applies a +1 to the other input of the sequencer adder and the original pointer is incremented by 1. This incremented pointer then replaces the original pointer value stored in the pointer store 29 and will be used to form the next memory addresses required in storing the contents of the set of auxiliary registers whose contents are to be stored in memory as a result of the decoding of the next save instruction 4A (FIG. 3) encountered by the computer circuitry 13 (FIG. 2A). Specifically, the simultaneous existence of the signals E, FFR = 1, and the 1 at the set output of the flip-flop 70 results in the gate 72 (FIG. 8) in the pointer control circuitry being enabled. When this gate 72 is enabled, its output enables the gates 76 and 79 resulting in the stored value +1 and the pointer contained in the pointer store 29 (FIG. 2B) being applied to the sequencer adder 16. The incremented pointer is then stored in the pointer store 29.

The foregoing has described how the sequencer 15 (FIG. 2B), operating in conjunction with the circuitry shown in FIG. 2A, utilized unused memory access cycles to transfer the contents X1 and X*n* of the registers R1 and R*n* (FIG. 2A) into the memory locations AREG11 (FIG. 4) and AREG*n*1, respectively, as a result of the execution of the save instruction 2A (FIG. 3). After this transfer has been accomplished and the contents of the pointer store updated, the storage control circuitry 18 (FIG. 2B) is disabled until the next save instruction 4A (FIG. 3) is executed.

Specifically, when the all zero contents of the register address store location ADDR.3 (FIG. 6) were accessed, the register address access circuitry 25 (FIG. 2B) and state detector 34 are initialized. This all zero address is applied to the clear circuitry 50 (FIG. 6) in the register address access circuitry 25 which responds by resetting the ring counter 51 to its zero state and clearing all the locations in the register address store. In essence, this initializes the register address access circuitry. In addition, it will be recalled that the zero detector 43 (FIG. 2B) generated a signal when the all zero address appeared at the output of the register address access circuitry 25, indicating that the sequencer 15 processing of the contents of the registers R1 and R*n* was completed. As indicated above, in addition to being used to initiate the updating of the contents of the pointer store 29, this signal also initiates a series of operations that disable the storage control circuitry 18. This zero detector 43 output signal is applied as an input to the AND gate 47 which is enabled if a save instruction is not being decoded at this time. The output of the gate 47 is applied as an input to the OR gate 36 which is connected to the reset side of the flip-flop 32. This gate responds to the application of this signal by applying a 1 signal to the reset inputs of the flip-flop 32, resetting this flip-flop.

It will be recalled that the flip-flop 32 (FIG. 2B) was set, indicating the decoding of the save instruction 2A (FIG. 3). When the output of the zero detector 43 results in this flip-flop 32 being reset, indicating the operations specified in the save instruction have been completed, this changes the input of the state detector 34 to an all 0 input since it is assumed that no save or restore instruction is being decoded at this time. For this input condition, the state detector 34 will no longer generate the signal E. Specifically, since both inputs to the OR gate 90 (FIG. 9) are 0, this gate will not be enabled. Additionally, the gate 47 (FIG. 2B) output enables the OR gate 96 (FIG. 9) resulting in the flip-flop 97 being reset to terminate the generation of the signal E. Similarly, the flip-flop 98 is reset by the output of the AND gate which is enabled by the set output of the flip-flop and the signal generated by the zero detector 43 (FIG. 2B). The removal of the signal E from its input to the pointer control 28 (FIG. 8) disables this circuitry and its removal from its input to the zero detector 43 (FIG. 2B) results in the removal of the zero detector output signal applied to the gate 47. The removal of this signal from its input to the gate 47 terminates the reset signal applied to the flip-flop 32 via the OR gate 36. In essence, the storage control circuitry 18 has, at this point, been disabled and will remain in this state until the next save instruction 4A (FIG. 3) is decoded.

In the foregoing discussion it has been assumed that none of the instructions executed in the program during the time the contents X1 and X*n* of the registers R1 (FIG. 2A) and R*n* were being stored in memory were either save instructions or restore instructions. Furthermore, it was assumed that there were a sufficient number of unused memory access cycles during the program execution to allow the storage control circuitry 18 (FIG. 2B) to store the register contents in memory without interrupting program execution. It will be recalled that the save instruction just discussed was stored in location 2A (FIG. 3) of the program being executed. Immediately after the decoding of this instruction the program instruction in location 2B was executed which resulted in a call to the subroutine SUB A. In essence, the above assumptions apply to the instructions contained in the subroutine SUB A which were being executed during the time the storage control circuitry 18 (FIG. 2B) was processing the contents of the registers R1 and R*n*.

It will now be assumed that the save instruction in the location 4A (FIG. 3) of the subroutine SUB A is read into the instruction register 23 (FIG. 2A). This save instruction 4A is identical to the previously discussed save instruction in location 2A (FIG. 3) of the program. Essentially, this save instruction again indicates that the contents of the registers R1 (FIG. 2A) and R*n* are to be saved. Reference to FIG. 3 reveals that the program instruction in location 4B, which follows the save instruction 4A, is a call to the subroutine SUB B. Here again it will be assumed that the number of memory access cycles available to the storage control circuitry 18 (FIG. 2B) during the execution of the subroutine SUB B is sufficient to allow performance of the operations specified in the save instruction in location 4A by the storage control circuitry 18 without requiring an interruption of the execution of the subroutine SUB B.

The operations performed by the storage control circuitry 18 (FIG. 2B) in response to the decoding of the save instruction in the location 4A are essentially the same as those previously described in discussing its response to the save instruction in the location 2A (FIG. 3). It will be assumed that, at the time the second save instruction 4A (FIG. 3) is read into the instruction register 23 (FIG. 2A) and decoded, the registers R1 (FIG. 2A) and R*n* contain the data Y1 and Y*n*, respectively, as opposed to the data X1 and X*n* present in the registers when the first save instruction 2A was encountered. Generally, when the second save instruction 4A is decoded, the gates 5 and 7 (FIG. 2A) will again be enabled, resulting in the values Y1 and Y*n* being stored in the auxiliary registers AR1 and AR*n*, respectively. Furthermore, the addresses 1 and *n* of the registers R1 and R*n* will again be stored in the register address store 44 (FIG. 2B) and the flip-flop 32 will be set, resulting in a 1 being applied to the OR gate 37 and the memory access request signal AR being applied to the memory access priority control 17. The remaining operations will not be discussed in detail since they are identical to those previously described in discussing the sequencer's response to the first save instruction 2A (FIG. 3). The only difference in the current situation is that the pointer stored in the pointer store 29 (FIG. 2B) is not one greater in value since it was incremented by one after the storage control 18 completed the operations specified in the first save instruction.

When an unused memory access cycle is available, the memory access priority control 17 (FIG. 2B) will generate a signal AG and a memory address will be assembled in the address register 27 (FIG. 2B) consisting of the base address stored in the base address store 30, the register address of the register R1 accessed by the register address circuitry 25 and the contents of the pointer store 29. The address assembled in the address register 27 in this case will be the address AREG12 (FIG. 4) and, as previously mentioned, it will be in the format shown in FIG. 5. The application of this address AREG12, the register R1 address, and the signal EW generated by the pointer control circuitry 28 (FIG. 2B) to the write control 40 results in the contents Y1 of the auxiliary register AR1 (FIG. 2A) being stored in the memory location AREG12 (FIG. 4) of the memory 14 (FIG. 2A). After this storage operation is completed, and another signal AG occurs, the sequencer 15 (FIG. 2B) forms a new memory address AREG*n*2 in the address register 27 using the register R*n* address *n*. The application of this memory address, the register R*n* address, and the signal EW generated by the pointer control circuitry 28 (FIG. 2B) to the write control 40 results in the contents Y*n* of the auxiliary register AR*n* (FIG. 2A) being stored in the memory location AREG*n*2 (FIG. 4).

The above discussion of the storage control circuitry 18 (FIG. 2B) operations performed in response to the second save instruction 4A (FIG. 3), like the discussion of its operations performed in response to the first save instruction 2A, indicate how the contents Y1 and Y*n*, originally stored in the registers R1 and R*n*, are stored in the memory 14 without interrupting the execution of the subroutine SUB B. Since the contents of the two registers R1 and R*n* (FIG. 2A) specified the instruction 4A (FIG. 3) have been stored in the memory locations AREG12 and AREG*n*2, the contents of the pointer store 29 (FIG. 2B) will again be incremented by 1 and the storage control circuitry 18 will be disabled in the same manner previously described in discussing its operation in response to the decoding of the first save instruction 2A (FIG. 3).

It will be recalled that the data X1, X*n*, Y1, and Y*n* originally contained in the registers R1 and R*n* (FIG. 2A) have been saved since they will be required for the execution of the program as control of the computer returns from the subroutine SUB B to its calling subroutine SUB A and finally from the subroutine SUB A back to the main program 1A through 3A (FIG. 3). It will now be assumed that the execution of the subroutine SUB B, which is in control of the computer 13 (FIG. 2A) reaches the point where the restore instruction contained in location 6A (FIG. 3) is read into the instruction register 23. This restore instruction, like the save instructions previously discussed, indicates that the storage control circuitry 18 (FIG. 2B) must perform selected operations on the data that was at one time stored in the registers R1 and R*n* (FIG. 2A). In this case, the storage control circuitry will transfer the last stored contents Y1 and Y*n* of the registers R1 and R*n* from the auxiliary register AR1 and AR*n* back into the former registers and transfer the contents of the memory locations AREG11 and AREG*n*1 (FIG. 4) into the auxiliary registers.

As indicated above, since no new data has been stored in the auxiliary registers AR1 and AR*n* (FIG. 2A) in the interval between the storage resulting from the decoding of the save instruction 4A (FIG. 3) in subroutine SUB A and the execution of the restore instruction 6A in the subroutine SUB B, the desired data Y1 and Y*n* is still contained in the auxiliary registers AR1 and AR*n* (FIG. 2A). When the restore instruction 6A in the subroutine SUB B is read into the instruction register 23 (FIG. 2A), the instruction decoder 24 applies a signal R to the restore gate address matrix 42 along with the addresses 1 and *n* of the registers whose contents are to be restored. The signal generated by the restore gate address matrix 42 in response to these inputs enables the gates 6 and 8, resulting in the values Y1 and Y*n* being transferred from the auxiliary registers AR1 and AR*n* to the registers R1 and R*n*, respectively. In essence, these operations restore the data Y1 and Y*n* required for the execution of the subroutine SUB A to the machine registers R1 and R*n* (FIG. 3) prior to returning control of the computer to the subroutine SUB A from subroutine SUB B.

While the required data Y1 and Y$n$ is being restored to the registers R1 and R$n$ (FIG. 2A), the sequencer 15 (FIG. 2B) responds to the signal R generated by the instruction decoder 24 (FIG. 2A) by performing the necessary operations to extract the data from memory that will be required when the restore instruction 5A (FIG. 3) in the subroutine SUB A is encountered and store this data in the auxiliary registers AR1 and AR$n$ (FIG. 2A). These operations are very similar to those described in the previous discussion of sequencer 15 (FIG. 2B) operations performed as a result of decoding a save instruction. Initially the sequencer 15 is enabled by the same instruction decoder signal R that is applied to the restore gate address matrix 42 (FIG. 2A) when a restore instruction is decoded. This signal R is applied to the OR gate 35 (FIG. 2B) which has its output connected to the set side of the flip-flop 33. The enabling of the gate 35 results in the flip-flop 33 being set and a 1 being applied to the state detector 34. The state detector 34 responds to this input by generating the signal E which indicates that either a save or a restore instruction has been decoded and this signal E is applied to the pointer control circuitry 28. More specifically, the 1 output of the flip-flop 33 enables the OR gate 90 (FIG. 9) in the state detector and the output of this gate combined with the signal E and the reset output of the flip-flop 98 enables the AND gate 95. Enabling the AND gate 95 sets the flip-flop 97 which results in the signal E being generated by the state detector 34 (FIG. 2B).

Simultaneously, the signal R is also applied to the function detector 26 (FIG. 2B) and results in the signal M being applied to the pointer control circuitry 28 when the memory address granted signal AG is returned by the memory address priority control 17. The occurrence of the signal R resets the flip-flop 60 (FIG. 7) in the function detector and when the memory access granted signal AG is generated, the gate 62 is enabled, generating the signal M. The pointer control circuitry 28 (FIG. 2B) responds to the simultaneous application to the two signals E and M by initially decrementing the pointer stored in the pointer store 29 by 1. This decrementing of the pointer occurs when the signals E, M, and $\overline{Z} = 1$ indicating tht pointer is not equal to 1, and the reset output of the flip-flop 75' enables the AND gate 73' (FIG. 8) whose output enables the gates 76 and 81. It will be noted that the flip-flop 75' is reset by the signal FFR each time the sequencer updating occurs after the contents of all the registers specified in a restore instruction have been processed and set by the output of the gate 73'. The purpose of this flip-flop is to insure no decrementing of the pointer occurs after the initial decrementing when the contents of the registers are being processed in response to the decoding of a restore instruction. Enabling the two gates 76 and 81 results in the contents PTR of the pointer store 29 (FIG. 2B) and a minus 1 being applied to the sequencer adder which responds by decrementing the pointer PTR.

As previously mentioned in discussing save instructions, upon the occurrence of the signal AG the gate 57 (FIG. 6) in the register address access circuitry will be enabled since there is a 1 output from the ring counter indicating it is in its zero state. Enabling the gate 57 results in the ring counter entering state one and generating a signal that enables the gate 52, resulting in the register address of the register R1, contained in the register address store location ADDR.1 appearing at the address output of the register access circuitry.

Following the decrementing of the pointer, and accessing the address of the register R1 from the register address store 44 (FIG. 2B), the address of the next memory location to be accessed from memory is formed by gating the decremented pointer and the register R1 address into the address register 27 (FIG. 2B) which also contains the base address making up the rest of the desired memory location address (FIG. 5). The detailed operation of the circuitry performing these functions is similar to that previously described in discussing the sequencer operations performed in response to the decoding of a save instruction. Enabling the gate 73' (FIG. 8) during the pointer decrementing operations described above results in the OR gate 74 being enabled and setting the flip-flop 75. The set output of this flip-flop enables the gate 31 (FIG. 28), transferring the pointer store contents into the address register 27, in the same manner as in the case of a save instruction.

In the example being discussed, the new address formed with the decremented pointer in the address register 27 (FIG. 2B) will be the address AREG11 (FIG. 4) which identifies the memory location containing the contents X1 of the register R1 which were previously stored as a result of the execution of the program save instruction 2A (FIG. 3) just prior to the call to the subroutine SUB A. In this case the address AREG11 is applied to the read control circuitry 39 (FIG. 2B) along with the address of the register R1 supplied by the register address access circuitry 25 and the read control enable signal ER. The signal ER is generated when the gate 77 (FIG. 8) is enabled by the setting of the flip-flop 75. The output of this gate 77 and the output of the flip-flop 71, which was set when the signal M occurred initially as a result of decoding a restore instruction, enable the read control enable circuitry 83, resulting in the generation of the signal ER.

The application of the address AREG11, the register R1 address, and the signal ER to the read control circuitry 39 (FIG. 2B) results in the contents X1 of the memory location AREG11 (FIG. 4) being accessed from memory by the read circuitry 21 (FIG. 2A) and gated through the gate 10 into the auxiliary register AR1. After the performance of these operations, the auxiliary register AR1 contains the quantity X1 which will be transferred to the register R1 when the next restore instruction is decoded.

The generation of the signal ER also results in the register address access circuitry 25 (FIG. 2B) accessing the address of the register R$n$ from the register address store 44 and this address replaces the address of the register R1 in the address register 27 when the next memory access granted signal AG occurs. The new address formed by this replacement includes the previously mentioned base address and pointer contained in the pointer store and it identifies the memory location AREG$n$1 (FIG. 4). This memory location contains the register contents X$n$ present in the register R$n$ (FIG. 2B) when the first save instruction 2A (FIG. 3) discussed was encountered immediately prior to the call to the subroutine SUB A. Application of this address AREG$n$1, the address of the register R$n$ generated by the register address access circuitry 25, and the signal ER to the read control circuitry 39 (FIG. 2B) results in the contents X$n$ of the AREG$n$1 memory location (FIG. 4) being accessed and gated through the gate 12 into the auxiliary register AR*n*. At this point, all of the operations required by the decoded restore instruction 6A (FIG. 3) have been completed and the data that will be required when the restore instruction 5A in the subroutine SUB A is encountered is contained in the auxiliary registers AR1 (FIG. 2A) and AR*n*. The operation of the storage control circuitry 18 is terminated when, as a result of the generation of the signal ER, the register address access circuitry 25 accesses the contents of the next register address store location ADDR.3 (FIG. 6) which will be an all zero quantity. The detailed circuit operations occurring at this time were previously described in discussing the storage control circuitry response to save instructions.

As previously indicated, it has been assumed in this discussion that the required number of unused memory access cycles were available to allow the data X1 and X*n* to be transferred to the auxiliary registers prior to the execution of the restore instruction in the subroutine SUB A. When the restore instuction 5A (FIG. 3) in the subroutine SUB A is read into the instruction register 23 (FIG. 2A), the instruction decoder 24 again generates a signal R which, along with the addresses of the registers R1 and R*n*, is applied to the restore gate address matrix 42. The restore gate address matrix responds again by generating a signal that enables the gates 6 and 8. Enabling these gates results in the data X1 and X*n* being transferred from the auxiliary registers AR1 and AR*n* into the registers R1 and Rn, respectively. Consequently, when the END instruction 5B (FIG. 3) is encountered in the subroutine SUB A, and control of the computer is returned to the instruction in the program following the call 2B to the subroutine SUB A, the data required to continue the execution of the program in the locations 1A through 3A are in the machine registers R1 (FIG. 2B) and R*n*.

When the data X1 and X*n* have been transferred into the auxiliary registers AR1 (FIG. 2A) and AR*n*, the register address access circuitry 25 will generate an all zero address the next time a memory access granted signal AG (FIG. 2B) is applied to it since all required register contents have been accessed from memory. More specifically, the existence of the condition PTR = 1 enables the detector 58 (FIG. 6) which generates a signal Z that inhibits the reading of register addresses into the register store 44. Additionally, signal $\overline{Z} = 0$ is applied to the gate 73' (FIG. 8) insuring that this gate remains disabled and the pointer in the pointer store is not decremented below the value one. Since the register address store 44 (FIG. 6) was cleared to zero after completing the operations required by the previously decoded restore instruction 6A (FIG. 3), the contents of the first register address store location ADDR.1 accessed will be equal to zero due to the signal Z inhibiting the storage of new addresses. The operation of the register address access circuitry 25 (FIG. 2B) in this case is the same as that previously described in detail in the discussion of the restore instruction 6A (FIG. 3).

Similarly, the response of the remainder of the storage control circuitry 18 (FIG. 2B) to this all zero address is similar to that previously described. The all zero address accessed by the register address access circuitry 25 is applied to the zero detector 43. With this input and the signal E the zero detector 43 generates a 1 output that is applied to the AND gate 48. Since the restore instruction 5A that was in the instruction register will have been replaced by another program instruction by this time, there will be no signal R at this time, and the gate 48 will be enabled, resulting in a 1 being applied to the reset side of the flip-flop 33 via the OR gate 35. It will be recalled that this flip-flop 33 was set when the restore instruction 5A (FIG. 3) was decoded. Resetting the flip-flop 33 indicates that the operations specified in the restore instruction 5A have been completed by the storage control circuitry 18. At this point, both of the flip-flops 32 and 33 are reset. This results in the gate 37 being disabled, insuring that the signal AG will not be generated by the memory access priority control 17 and the state detector terminating the generation of the signal E. Since the signal AG cannot get generated under these conditions the function detector 26 (FIG. 7) will not generate an output. Similarly, the state detector 34 (FIG. 9) will not generate the signal E since both inputs to the OR gate 90 are zero. Furthermore, the output of the zero detector 43 (FIG. 2B) also resets the flip-flop 46 and this results in the flip-flop 70 (FIG. 8) in the pointer control being reset. Additionally, neither of the gates 72 or 73 will be enabled since the signal E is not present. As previously mentioned, the gate 73 has been disabled due to the condition $\overline{Z} = 0$. Consequently, the pointer control 28 (FIG. 2B) in the storage control circuitry 18 is disabled and this circuitry will perform no data processing operations until it is again enabled by the decoding of a save instruction.

The foregoing has provided a description of how the illustrative embodiment of applicant's invention utilizes unused memory access cycles to a program in which save instructions are first executed resulting in the data present in two machine registers at the time of each instruction execution being stored in memory and then responds to the execution of two restore instructions by returning the stored data for the pair of machine registers from memory to these registers in the reverse order in which the data was stored. It was assumed that there were sufficient unused memory access cycles available after encountering each of the save or restore instructions to allow the storage control circuitry to complete the processing of the data specified in these instructions. In essence, it was assumed that there was no need to interrupt either the operation of the processor or the operation of the storage control circuitry while performing the operations required by each of the instructions.

If it is assumed that there may not be sufficient number of unused memory access cycles available after either a save or a restore instruction is encountered in a program to allow the storage control circuitry 18 (FIG. 2B) to complete processing the data specified in the instruction, it is necessary to provide some method of interrupting either the computer operation or the storage control circuitry operation. Generally there are two situations in which one of these types of interrupts will occur. The first situation arises when the storage control circuitry 18 (FIG. 2B) is responding to the decoding of a save instruction and another save instruction or restore instruction is encountered in the program being executed. The second situation is where the storage control circuitry 18 is responding to the decoding of a restore instruction and either a save instruction or restore instruction is encountered in the program being executed. In either of these cases, some provision is made to allow an orderly termination of the operations being performed at the time either one of these types of instructions is encountered.

When the storage control circuitry 18 (FIG. 2B) is responding to the decoding of a save instruction and another save instruction is encountered in the program being executed, the storage control circuitry 18 will generate a signal IR that inhibits further execution of the program until the storage control circuitry 18 completes the operations required by the original save instruction.

For purposes of discussion, it will be assumed that the storage control circuitry 18 (FIG. 2B) is performing operations required by a first save instruction when a second save instruction is read into the instruction register 23 (FIG. 2A) and decoded. Since the storage control circuitry 18 is performing operations required by a save instruction, the flip-flop 32 (FIG. 2B) will be set at this time resulting in a 1 being applied to the input of the state detector 34 which results in the signal E being applied to the pointer control 28. When the second save instruction in the instruction register 23 (FIG. 2A) is decoded by the instruction decoder 24, the instruction decoder 24 will generate the signal S which is applied to an input of the state detector 34 (FIG. 2B). The simultaneous existence of the 1 input from the flip-flop 32 and the signal S input from the decoder result in the state detector 34 generating a signal IR that is applied to the control unit 22 (FIG. 2A) of the computer. More specifically, these inputs enable the AND gate 91 (FIG. 9) in the state detector 34 resulting in the OR gate 96 applying a signal to a 1 input of the AND gate 101. The other inputs to this gate are a 1 from the reset side of the flip-flop 98 and a 1 representing the inverted output of the zero detector 43 (FIG. 2B). Hence, the gate 101 is enabled setting the flip-flop 98. The set output of this flip-flop 98 is the interrupt signal IR. The output of the gate 96 also enables the OR gate 99 whose output resets the flip-flop 97 terminating the generation of the signal E and this flip-flop remains reset since the setting of the flip-flop 98 disables the gate 95.

The application of the signal IR to the computer control unit 22 inhibits the control unit from reading any further program instructions as long as that signal IR is present as an input to the control unit. Furthermore, the signal IR is applied to the register address store 44 (FIG. 2B) and inhibits the input circuitry to this store insuring that its contents will not be replaced with the register addresses in the second save instruction currently in the instruction register 23 (FIG. 2A). The signal IR is also applied to the save gate address matrix 41 (FIG. 2A) and inhibits its operation to insure that no new data is transferred into the auxiliary registers AR1 through AR*n* until the data in these registers has been stored. The signal IR will continue to be applied to the control unit 22 (FIG. 2A), the save gate address matrix 41, and the register address store 44 (FIG. 2B) until the sequencer 15 completes the operations, required by the first save instruction, being executed when the second save instruction was encountered.

When the storage control circuitry 18 (FIG. 2B) completes the operations required by the first save instruction, the zero detector 43 will generate a signal that is applied to the state detector 34. The combination of this input with the 1 input from the set side of the flip-flop 98 (FIG. 9), which represents the signal IR, results in the state detector 34 terminating the IR signal output and generating the E signal output. More specifically, these two inputs enable the AND gate 100 in the state detector. The output of this gate is applied to the reset side of the flip-flop 98, terminating the generation of the signal IR. Additionally, the inverted output of the zero detector disables the gate 101 to insure that the flip-flop 98 is not reset prior to the second save instruction being replaced by another instruction as the computer begins to again execute the program. Generation of the signal E occurs as a result of the existence of the 1 output from the reset side of the flip-flop 98, the 1 output from the set side of the flip-flop 32 (FIG. 2A) which has remained set, and the signal $\bar{E} = 1$ enabling the AND gate 95 whose output sets the flip-flop 97. At this point, the storage control circuitry will begin performing the operations required by the instruction in the instruction register 23 and the computer will begin reading and executing program instructions. The operation of the storage control 18 in responding to the requirements specified in the second save instruction is similar to that previously described in discussing the save instructions mentioned above.

Another situation that may be encountered is the case where the operations specified in a save instruction are being performed by the storage control circuitry 18 (FIG. 2B) when a restore instruction is read into the instruction register 23 (FIG. 2A). When this situation occurs, the instruction decoder 24 (FIG. 2A) generates a signal R that is applied to the state detector 34 (FIG. 2B). At the same time, the 1 output from the set side of the flip-flop 32 is applied to another input of the state detector 34 since a save instruction was the machine instruction decoded prior to the restore instruction currently in the instruction register 23. This combination of inputs to the state detector 34 enables the AND gate 93 (FIG. 9) in the state detector which results in the signal ASI being applied to the OR gate 36 (FIG. 2B) that drives the reset side of flip-flop 32. This gate responds to the application of the signal ASI by generating a signal that resets the flip-flop 32.

In essence, the signal ASI terminates the response of the storage control circuitry 18 (FIG. 2B) in performing any further operations required by the save instruction. More specifically, the termination of the storage control response to the save instruction results from the application of the signal ASI to the pointer control circuitry 28. The OR gate 89' (FIG. 9) in the pointer control circuitry 28 is enabled by the signal ASI and the output of this gate resets the flip-flop 70, insuring that the write control 78 is disabled. The operations of gating auxiliary register $AR_i$ contents into registers $R_i$ and storing register address data in response to the presence of the signal R at the instruction decoder 24 (FIG. 2A) output are the same as previously described in discussing restore instructions and they occur simultaneously with the above mentioned operations.

When the save flip-flop 32 (FIG. 2B) is reset, the state detector 34 will no longer generate the signal ASI. At this time, the 1 output of the restore flip-flop 33, which is set as a result of decoding the restore instruction encountered while the operations specified in the previously decoded save instruction were being performed, results in the detector 34 generating the signal E and the storage control circuitry 18 begins to perform the operations specified in the restore instruction. All of the operations occurring due to the decoding of a restore instruction when operations specified in a previously decoded save instruction are being performed, are performed without interrupting the program execution of the computer 13 (FIG. 2A) if sufficient unused memory access cycles are available.

In the situation where the storage control circuitry 18 (FIG. 2B) is performing operations specified in a first restore instruction and a second restore instruction is encountered in the program, the storage control circuitry responds in a manner similar to that described above in discussing the same situation in regard to save instructions. In this situation the storage control circuitry also generates the signal IR that inhibits further instruction reading by the computer 13 (FIG. 2A) until the operations specified in the first store instruction have been completed. More specifically, in the case being discussed, the flip-flop 33 will be set and a 1 output from the set side of this flip-flop will be applied to the state detector 34 as a result of the decoding of the first restore instruction. Simultaneously, the reading of the second restore instruction into the instruction register 23 (FIG. 2A) will result in the decoder 24 generating a signal R that is also applied to the input of the state detector 34. The presence of these two signals as inputs enables the gate 92 (FIG. 9) in the state detector 34 resulting in the flip-flop 98 being set and the flip-flop 97 being reset in a manner previously described. Resetting the flip-flop 97 results in the signal E being terminated while setting the flip-flop 98 results in the interrupt signal IR being applied to the control unit 22 (FIG. 2A) in the computer 13 (FIG. 2A). As previously mentioned, applying this signal IR to the control unit results in the instruction read circuitry in the control unit being inhibited. The signal IR is also applied to the input circuitry of the register address store 44 (FIG. 2B) to inhibit the reading of any new data into that store until the storage control circuitry has completed the operations specified in the first restore instruction. Similarly, the signal IR also inhibits the operation of the restore gate address matrix 42 (FIG. 2A) during this interval to insure no data is transferred to the registers R1 through R*n*. It is necessary to inhibit this data transfer since the auxiliary registers AR1 through AR*n* will not contain the correct data until all of the operations specified in the first restore instruction have been completed.

When the storage control circuitry 18 (FIG. 2B) has completed the operations required by the first restore instruction, the zero detector 43 will generate a signal that is applied to the state detector 34. The application of this signal to the state detector 34 enables the gate 100 (FIG. 9) and this, as in the case of the save instruction, results in the generation of the signal IR being terminated, indicating that the storage control circuitry 18 has completed the operations specified in the first restore instruction. At this point the storage control circuitry 18 will begin performing the operations specified in the second restore instruction in the same manner as previously described in discussing the save instructions and the computer 13 (FIG. 2A) will again begin reading and executing instructions.

Finally, one other situation may arise where the operations specified in a restore instruction are being performed by the storage control circuitry 18 (FIG. 2B) and a save instruction is read into the instruction register 23 (FIG. 2A). When this situation occurs, the storage control circuitry 18 ceases its performance of the operations specified in the restore instruction and begins to perform the operations specified in the newly encountered save instruction. More specifically, in this situation, the flip-flop 33 (FIG. 2B) will be set when the save instruction is encountered since a restore instruction has been decoded and the operations it specified have not yet been completed by the storage control circuitry. When the flip-flop 33 is set the 1 output from its set side will be present as an input to the state detector 34. After the save instruction is read into the register 23 (FIG. 2A), the instruction decoder 24 will generate the signal S which sets the flip-flop 32 (FIG. 2B) and is also applied as an input to the state detector 34. The simultaneous application of 1 outputs of the flip-flop 33 and the signal S as inputs to the state detector 34 enables the AND gate 94 (FIG. 9) in the state detector which generates the signal ARI. This signal also enables the OR gate 99 resulting in the signal E being terminated.

The signal ARI is applied to the OR gate 35 (FIG. 2B) and the pointer control circuitry 28. Application of the signal ARI to the OR gate 35 results in the flip-flop 33 being reset. When the signal ARI is applied to the pointer control circuitry 28, the operation of the sequencer 15 is inhibited and it will perform no further operations until the signal ARI is terminated. More specifically, the signal ARI enables the OR gate 89 (FIG. 9) and the output of this gate resets the flip-flop 71. When the flip-flop 71 is reset the read control enable circuitry 83 is disabled and no accessing of memory contents will occur. The signal ARI will terminate when the gate 94 (FIG. 9) is disabled after the flip-flop 33 (FIG. 2B) is reset in response to the application of this signal. The application of the signal S from the instruction decoder to the set side input of the flip-flop 32 sets this flip-flop. At this time, the input to the state detector 34 (FIG. 2B) is a 1 from the set output of the flip-flop 32. As previously described, this input enables the gate 90 (FIG. 9) in the state detector and this results in the signal E being generated. It will be recalled that applying the signal E to the pointer control 28 enables the sequencer 15 and, in the case being discussed, the operations specified in the save instruction just decoded will be performed.

At the time this save instruction was decoded, the contents of the registers R1 through R*n* (FIG. 2A) specified in the instruction were transferred into the appropriate auxiliary registers AR1 through AR*n* and the register address information was transferred into the register address store 44 in the same manner previously described in discussing save instructions. In fact, from this point on, the operation of all the circuitry in FIG. 2A and 2B is the same as that previously described in discussing the system's response to the decoding of a save instruction when the storage control circuitry 18 (FIG. 2B) was available for use.

The foregoing has described the illustrative embodiment of applicant's invention in detail. It has shown how the illustrative embodiment, utilizing unused memory access cycles, responds to the decoding of a save or restore instruction to either store or access data representing machine register contents. Where sufficient unused memory access cycles are available, the storing or accessing operations are completed without interrupting the execution of the program in which the save or restore instruction intiating these operations was encountered. If there are an insufficient number of unused memory cycles available to allow the completion of the operations being performed before another save or restore instruction is encountered, the program being executed may be interrupted to allow the completion of the operations in some cases and, in other cases, no attempt will be made to complete the operations before the set of operations specified in the newly encountered instruction are begun.

It is clear that the embodiment of applicant's invention described above is merely illustrative in nature and that, in view of the description, numerous other arrangements and adaptations embodying the principles of and falling within the spirit and scope of the invention will be obvious to one skilled in the art.

What is claimed is:

1. In combination, memory means for storing information comprising sequences of program instructions and data, means for accessing said memory to read information from and to write information into said memory;

a program controlled data processor for executing instructions of a set of instructions which set includes SAVE and RESTORE instructions comprising:

instruction register means, instruction decoder means connected to said instruction register means for generating processor control signals corresponding to instructions stored in said instruction register means and including signals indicating the busy and idle states of said memory, a plurality of internal registers for storing data, means for controlling said memory accessing means to transfer instructions from said memory means to said instruction register means;

a plurality of auxiliary registers corresponding in number and individually associated with certain of said internal registers, gating means responsive to certain of said processor control signals corresponding to said SAVE and RESTORE instructions for exchanging data between said certain registers and said individually associated auxiliary registers; and independent control means responsive to said certain processor control signals and to said memory idle signals for exchanging data between said auxiliary registers and said memory means.

2. The combination in accordance with claim 1 wherein said instruction decoder generates processor control signals to control said gating means to transfer the contents of said plurality of internal registers simultaneously to said individually associated auxiliary registers in response to the appearance of a SAVE instruction in said instruction register means and wherein said instruction decoder generates processor control signals to control said gating means to transfer the contents of said plurality of auxiliary registers simultanuously to said corresponding internal registers in response to the appearance of a RESTORE instruction in said instruction register means.

3. The combination in accordance with claim 1 wherein said independent control means is responsive to processor control signals indicating the appearance of a SAVE instruction in said instruction register and to said memory idle signals to store in said memory means the contents of said plurality of auxiliary registers on a serial word-by-word basis without altering the contents of said auxiliary registers.

4. The combination in accordance with claim 1 wherein said independent control means includes signal generating means to inhibit momentarily the execution of a program by said program controlled data processor upon the appearance of another SAVE instruction in said instruction register prior to the time said independent control means has completed transfer of the information content of said auxiliary registers to said memory in response to the appearance of an immediately preceding SAVE instruction in said instruction register and upon the appearance of another RESTORE instruction in said instruction register before said independent control means has completed transfer of data from said memory to said auxiliary registers in response to the appearance of an immediately preceding RESTORE instruction in said instruction register.

* * * * *

UNITED STATES PATENT OFFICE
CERTIFICATE OF CORRECTION

Patent No. 3,781,810 Dated December 25, 1973

Inventor(s) Randall William Downing

It is certified that error appears in the above-identified patent and that said Letters Patent are hereby corrected as shown below:

Column 5, line 44, "ment applicant's invention" should read --ment of applicant's invention--. Column 6, line 23, and wherever it further appears, the number "1" should be in quotation marks. Column 7, line 51, "set, and the" should read --set, the ---. Column 8, line 25, and wherever it further appears, the number "0" should be in quotation marks. Column 15, line 43, "indicating tht pointer" should read --indicating that pointer--. Column 20, line 63, "the detector 34" should read --the state detector 34--.

Signed and sealed this 17th day of September 1974.

(SEAL)
Attest:

McCOY M. GIBSON, JR.
Attesting Officer

C. MARSHALL DANN
Commissioner of Patents